3,189,462
PROCESS FOR THE PREPARATION OF PRECOOKED RICE
Harry S. Autrey and Lawrence Lynn, Houston, Tex., assignors to River Brand Rice Mills, Inc., Houston, Tex., a corporation of Delaware
No Drawing. Filed Sept. 1, 1964, Ser. No. 393,715
26 Claims. (Cl. 99—80)

This application is a continuation-in-part of our application Serial No. 202,073 filed June 13, 1963, which in turn is a continuation-in-part of our application Serial No. 164,138, filed January 3, 1962, both now abandonded.

This invention relates to a new and improved method for the preparation of an instant or precooked rice product, and more particularly to a method for creating a precooked rice or a precooked parboiled rice that can be rapidly rehydrated for serving and that upon rehydration has attributes of natural flavor and texture that more nearly approach those of a good grade of regular cooked rice, cooked parboiled rice, or cooked brown rice, than it has been possible to achieve with prior methods of preparing precooked rice.

The method of this invention may be used to create a precooked rice product from any of three common types of rice, i.e., raw milled polished or white rice; brown rice; or parboiled rice. Raw milled or white rice is rice from which both the husk and bran coating have been removed. Brown rice is raw rice or parboiled rice from which the husk has been removed but in which the bran outer coating remains substantially intact. Parboiled rice is created by soaking rough rice paddy (unhulled rice substantially as it comes from the field) in cold, warm, or hot water for a substantial period of time, until the rice grains have increased their moisture content, generally to at least above 20%; draining the rice; and then steaming the rice, generally at superatomspheric pressure, for from 15 minutes to an hour or more. The steaming opens the hulls and subsequent to steaming the grains are dried and then milled.

Typical dry parboiled rice is somewhat discolored as compared with ordinary raw white rice. The bran coating on rice grain is rich in nutritional elements including vitamins and minerals, and for this reason brow rice is generally considered more valuable nutritionally than white rice. A major advantage of the parboiling process is that during the steaming step, and especially when the steam is at superatmospheric pressure, nutritional elements in the bran coating, such as vitamins and minerals, tend to be driven into or to migrate into the rice grains. During the actual parboiling or steaming step, the starch in the rice grains is substantially gelatinized, and since the rice grains are protected by the hull and the bran coating, they tend to retain their original shape. After the grains have been thoroughly steamed, the hulls begin to separate from the kernels or grains. At the end of the steaming, the kernels consist of a gelatinized elastic starch which becomes translucent and hard upon drying.

The process of preparing parboiled rice is known and used in a number of Asian countries, such as, India, Burma, Malaya, and Ceylon, where it has apparently been practiced for thousands of years. In these countries, the drying is usually accomplished by spreading the steamed rice grains in the sun rather than by artificial means. Aside from differences in the drying means and cooking or steaming at superatmospheric pressure, the process of parboiling rice as practiced today is basically the same as that which has been used for many years under primitive conditions.

In addition to the advantage of transferring nutritive elements from the bran and germ into the grain or endosperm, the parboiling process also provides the following advantages: (1) parboiled rice keeps better both before and after cooking; (2) parboiled rice is more resistant to insect infestation and any existing infestation is destroyed in the process; (3) breakage in the milling step is substantially reduced and a higher yield of quality kernels is obtained; (4) a distinctive flavor is imparted to the rice grains, this flavor being preferred by some users; and (5) recipe tolerance is improved.

One disadvantage of parboiled rice as compared to raw white rice is that ordinary parboiled rice requires a longer kitchen cook time before it is ready for serving. The time required for cooking regular raw white milled rice of the Bluebonnet, Texas Patna, Rexoro, or similar varieties is about 15 minutes of residence in water at 212° F., whereas the time required for cooking parboiled rice is customarily about 25 to 30 minutes at 212° F. Accordingly, the desirability of a process for preparing a precooked rice product of acceptable quality may be considered even greater for parboiled than for regular milled white rice.

Many attempts have been made to treat rice grains to impart quick-cooking properties, with the object of producing economically with high acceptability and at high yields, precooked rice or precooked parboiled rice in the dehydrated state which, on rapid rehydration, will closely approach in terms of appearance and organoleptic acceptability a good grade of freshly cooked regular or parboiled rice. Such prior art teachings, however, have left many shortcomings in flavor, rate of rehydration, degree of rehydration possible, dry or rehydrated appearance, color, mouth feel and texture, storageability, and the like. In many instances the rehydrated final product is excessively bland, or lacking in natural flavor because of the damage to the flavor precursors or to the flavor itself inherent in the processing step.

In some instances of the prior art, the pretreatment of the raw material needed to permit a uniform cook irreversibly destroys the texture. In other instances where some quality is achieved, this achievement can be made with only extremely high capital cost facilities, and expensive processing as, for example, is characteristic of one process for preparing parboiled rice which comprises the steps of freezing the cooked parboiled rice followed by drying of the initially frozen rice cake at low temperatures for prolonged periods of time, as set forth in U.S. Patent No. 2,813,796. Compounding the problem of pretreatment, whether by heat or water, and the problem of precooking, is the problem of dehydration which must fix the structure, remove water sufficiently to satisfy stability requirements, and permit easy and rapid rehydration in the product.

It has been found that a significant improvement over the prior art can be achieved by the process of this invention, which results in high yields of an instantized regular rice, brown rice, or parboiled rice product which on rapid rehydration yields an end-product characterized by the natural flavor and grain individuality approaching that of a good grade of regular rice or parboiled rice. The precooked parboiled rice of this invention has resistance to crumbling or falling apart in formulated recipe applications, such as, soups and casserole dishes—a characteristic particularly important to the institutional user of parboiled rice.

Among the important and valuable results achieved by this invention are that it makes available to the manufacturer for sale and to the consumer for use, precooked rice products that save kitchen preparation time and avoid recipe errors which might otherwise result in poor end-product characteristics.

Accordingly, it is a primary object of this invention to provide a new and improved process for the creation of a precooked rice, brown rice, or precooked parboiled rice product that results in high yields of rapidly rehydratable rice grains that upon rehydration have attributes of natural flavor and texture that more nearly approach those of a good grade of regular cooked rice or parboiled rice than has been possible to achieve with prior methods.

It is another object of this invention to provide a new and improved process for the creation of a precooked rice or precooked parboiled rice product in which the sequence of basic process steps is mutually cooperative, so that structural disturbances in the rice kernel created in the early pretreatment steps to aid performance of the cooking and drying steps are specifically remedied in the later steps. Correspondingly, the early or pretreatment steps lend tolerance to the operation and particularly to the quality-determining factors inherent in the later steps so that the product and its attributes may be both very nearly uniform and of high quality.

Another object of this invention is to provide a novel and improved process for the creation of a precooked rice or precooked parboiled rice product that includes a step of thermal cycling pretreatment of raw or parboiled rice grains to render them highly permeable and absorptive to permit rapid cooking and rapid and uniform dehydration with retention of flavor and quality uniformity upon rehydration.

It is another object of this invention to provide a novel and improved process for the creation of a precooked rice or precooked parboiled rice product that includes a thermal cycling pretreatment step that avoids prolonged exposure to high temperatures thus preventing damage to flavor precursors. Such pretreatment step renders the raw or parboiled rice grains highly permeable and absorptive and thus permits rapid processing after pretreatment and a reduction in the time during which flavor or flavor precursors are subjected to destructive influences. In the thermal cycling pretreatment step of this invention, extremes of both high and low temperatures are avoided; flavor precursors and texture are thus preserved and broken grains are kept to a minimum.

Another object of this invention is to provide a novel and improved process for the creation of a precooked rice product that can be very rapidly rehydrated for serving in from two to five minutes or less.

A further object of this invention is to provide a novel and improved process for the creation of precooked parboiled rices which can be rapidly rehydrated either alone or in combination with other dehydrated ingredient to a desired texture by a variety of method including but not limited to, the following methods: (a) by immersion and residence for about 5 minutes in water which has been brought to a boil, (b) by immersion in cold water which is immediately followed by bringing the water-rice combination to a boil, removing it from the heat, and then allowing it to stand from 2 to 10 minutes, or (c) by slow simmering in water which has been brought to a boil for from 5 to 15 minutes. Rice precooked by method (c) can be reheated after cooling without significant damage to the grains.

It is a further object of this invention to provide a novel and improved process for the creation of a precooked parboiled rice product from regular parboiled white rice in which the precooked parboiled rice product will have a high resistance to particle dissociation or crumbling apart in soups and casseroles. The latter is a problem typically encountered with many recipe applications for precooked white rice prepared from regular milled white rice, and a problem which precludes the use of instantized rices for certain institutional recipe uses.

It is a still further object of this invention to provide a novel and improved process for the creation of a precooked rice or parboiled rice product that includes the steps of pretreating raw or parboiled rice grains by exposing the grains to an elevated temperature to create expansion rifts and crevices in the surfaces of the grains, then rapidly exposing the heated grains to a low temperature to create compression chinks and cracks in the grains, then rapidly exposing the cooled grains to a second elevated temperature to open the compression chinks and cracks and enlarge the expansion rifts and crevices, and then preferably again rapidly cooling the heated grains and optionally subjecting the grains to such further alternate rapid heating and cooling steps as may be advantageous in terms of the product attributes desired and raw material used, whereby the rice grains are rendered highly permeable and absorptive and capable of being rapidly cooked and dried. The combination of expansion rifts and crevices with compression chinks and cracks serves to provide grains having a very high degree of permeability and absorptiveness without sacrificing their basic integrity through subjection to excessively high temperatures.

Additional objects and advantages of the invention will be set forth in part in the description which follows and, in part, will be obvious from that description, or may be learned by practice of the invention; the objects and advantages being realized and attained by means of the processes, steps and combinations particularly pointed out in the appended claims.

To achieve the foregoing objects, and in accordance with its purpose, this invention provides a process which, as embodied and broadly described, comprises a novel and improved combination of steps, including the steps of pretreating raw or parboiled rice grains by exposing the grains alternately to high and low temperatures in rapid succession, to render the grains more highly permeable and absorptive; cooking the grains by subjecting them to heat and moisture until they are substantially completely gelatinized, and rapidly drying the cooked grains to a stable moisture content with a heated gas.

In accordance with this invention, a new and improved process is provided for creating a precooked white, brown, or parboiled rice product that can be rapidly rehydrated to yield a highly palatable and desirable cooked rice having attributes more nearly approaching the natural flavor and texture of a good grade of regular cooked rice or parboiled cooked rice than has been possible to achieve with any prior methods.

As embodied in one preferred embodiment of this invention, the process may successfully employ as raw material, rice of long, medium, or short grain at its normal moisture content of 10 to 14%. The rice may be either milled white or brown. The conditions following are illustrative of the processing of milled white rice, but it will be apparent to those skilled in the art that the sequence taught, with appropriate modifications in operating conditions, would be applicable also to brown rice.

As embodied in another preferred embodiment of this invention, this process may successfully employ as raw material parboiled rice of the long, medium, or short grain class at its normal moisture content of 10 to 14%. The conditions following are illustrative of the processing of parboiled rice made from the Bluebonnet variety, but it will be apparent to those skilled in the art that the sequence taught with appropriate modifications in operating conditions, can be applied to parboiled rice prepared from other varieties and grain lengths.

In one embodiment of the process, milled white, brown, or parboiled rice, is first fed, preferably at a controlled rate of flow, through a pretreatment chamber on a conveyor, or a multiplicity of conveyors arranged in series. When a multiplicity of conveyors is used, a minimum of four such conveyors is desirable. A bed of rice reposes upon each conveyor and may be either turbulent or relatively quiescent.

For raw rice, the static thickness of the beds should be from 1 to 3 inches, preferably about 1.25 inches, and for parboiled rice, should be from ½ to 2½ inches, preferably about 1 inch. If a single bed is employed, as in batch processing, it is operated in sequence through steps simulating a multiplicity of chambers.

In accordance with the invention, steps are provided for gentle thermal cycling of the rice grains to make them highly permeable and absorptive and thus to enable a rapid cook, rapid rehydration of the precooked product, and retention of flavor and uniformity of quality. In the thermal cycling portion of this invention as here embodied for raw rice, the feed material in the first chamber is initially heated from its ambient temperature condition to an elevated plateau temperature that may be from 120 to 220° F., is advantageously 130 to 180° F., and preferably is 140 to 160° F.; and for parboiled rice, may be from 200 to 225° F., and is preferably about 210° F. Heated air is used as the heating medium, and if the ambient air should contain too much moisture, heated dehumidified air is used. This heating to the plateau temperature is accomplished in from 30 to 75 seconds, preferably about 50 seconds, and the plateau temperature is maintained such that the total time in this operation is preferably about 5 minutes, but may be from 3 to 7 minutes.

The rice is then moved into the second chammber, where it is quick chilled by cool air that may be from 60 to 100° F., and is preferably 85 to 95° F. for raw rice; and preferably 75 to 90° F., for parboiled rice. The total residence time of rich in this cooling step is from 3 to 10 minutes, preferably about 5 minutes.

The rice is then transferred to the third chamber and is again heated as before in about 30 to 75 seconds to a temperature equal to or preferably slightly exceeding the temperature attained in the plateau portion of the first heating cycle which may be from 120 to 230° F., is advantageously 140 to 190° F., and is preferably 150 to 170° F. for raw rice; and may be from 200 to 225° F. and is preferably about 210° F., for parboiled rice; but should always be below 240° F. The rice is then retained at the plateau temperature for a combined residence time of from 3 to 15 minutes, and preferably about 5 minutes.

The rice is preferably then again rapidly chilled, to a reduced temperature using cool air that may be from 60 to 100° F.

This procedure may be repeated using a number of additional rapid heating and cooling steps with the value of the temperature being dependent on the type and nature of raw material, but for optimum pretreatment with milled white rice, brown rice, or parboiled rice, of most common varieties, two heating and two cooling steps with the heating and cooling steps alternating in sequence as described above is considered ideal insofar as further processing and final product quality are concerned.

In the first elevated temperature step of the thermal cycling pretreatment, the raising of the temperature of the rice grains at a fairly high heat transfer rate during the first 30 to 75 seconds causes a multiplicity of tiny rifts and crevices almost invisible to the naked eye, to form in the surface of the grains due partly to loss of stable moisture content upon heating. The second pretreatment step, or the cooling step, because it follows the first heating step in rapid succession and is conducted at a fairly rapid heat transfer rate during the first few minutes, causes the rice grains to form compression chinks and cracks as a result of the sudden downward shift in temperature. The third pretreatment step, or the second heating step, also conducted at a fairly high heat transfer rate during the first 30 to 75 seconds, causes the grains to once more expand and causes additional moisture to be driven off; in so doing, the compression chinks and cracks as well as the previously formed expansion rifts and crevices are induced to open and enlarge and some additional crevices are formed. This condition of a multiplicity of small expansion rifts and crevices and compression chinks and cracks is further increased by completing the second thermal cycle with a second rapid cooling step or fourth pretreatment step. By this rapid thermal cycling pretreatment, the rice grains are given a highly permeable and absorptive structure.

The thermal cycling pretreatment step contributes significantly towards enabling a rapid cook, rapid dehydration, retention of flavor and uniformity of quality. In its avoidance of extremes of temperature or prolonged exposure to high temperatures, it leads to the formation of very few broken grains and to extremely rapid processing after thermal cycling, thus reducing the time during which flavor or flavor precursors are subjected to destructive influences. In these and other respects, thermal cycling is a major advance over prior teachings, which incorporate only heating, or only chilling, or only some simple non-time-dependent combination of steps of each at either highly elevated or reduced temperatures.

Following the final step of the thermal cycle, which in the preferred embodiment is a cooling step, the rice may be further rapidly chilled by quenching it with water to reduce the temperature quickly by a rapid rate of heat transfer.

Immediately, or shortly after thermal cycling, the rice is fed into a batch or continuous cooker for gelatinization. At this time the moisture content of the rice grain is from 5 to 9% and preferably about 6.5%. This cook may be carried out by water immersion in substantially boiling water at atmospheric pressures or at pressures up to 5 p.s.i.g., preferably the water is from 195 to 210° F. and below 5 p.s.i.g, by steaming, by combinations of immersion and steaming including alternate immersion and steaming as taught by U.S. Patent No. 2,195,165 to Choppin et al., or by combinations of immersion, spraying and steaming.

The duration of the cooking step for raw rice is preferably from 9 to 13 minutes, but may be from 8 to 16 minutes, and for parboiled rice is preferably from 18 to 25 minutes, but may be from 17 to 28 minutes. At the end of the cooking step gelatinization will be substantially complete. Upon completion of cooking the gelatinization reaction should be abruptly terminated and the surface slightly case hardened by quenching in accordance with the prior art teachings of U.S. Patent No. 400,835 to Donelson. An abundance of cold water is efficacious for such rapid quenching.

In accordance with the invention, near the completion of cooking an additional step may be advantageously included primarily to firm the surface of the rice grains. As preferably embodied, this step includes atmospheric steaming of the grains in the form of a moving bed with simultaneous addition of water by spraying as disclosed by U.S. Patent Nos. 2,195,165 and 2,213,623 to Choppin et al. It may also be desirable to terminate the cook with a very short period of atmospheric steaming, preferably of from 0.5 to 3.5 minutes in duration. The process may preferably also include an intermediate cold water or air quenching step before the combined spraying and steaming step. When empolyed, terminal steaming is advantageously conducted so as to firm the surface of the rice with little or no additional cooking, and this is evidenced by either a negligible increase or decrease in moisture content during such steaming step. Steaming substantially longer than this minimal time is not necessary and usually is to be avoided since this tends to destroy or carry off, as by steam distillation, the subtle and volatile flavor elements native to the rice grains.

It has been found that an extremely white, dry, rehydrated rice will result from the use of distilled water or regular clean water adjusted to a pH of from 5 to 7 in the cook and wash, when immersion cooking or alternate immersion and steaming is used. Such an extremely white rice may be attractive to and particularly desired by certain consumers. Except for color, however, such a precooked rice exhibits essentially the same physical and organoleptic properties as the product made without the use of distilled water or water in which the pH has not been adjusted.

The cooled and slightly case-hardened, precooked rice with a moisture content of 65 to 75%, and preferably from 65 to 73%, is then washed and drained in cold water both to intensify the case-hardening and for removal of any surface slime and residue of ruptured starch cells before surface draining for 4 to 10 minutes and transfer to the drying equipment.

The drying may be effected in either a batch or continuous manner, the moisture being most effectively removed by a stream of heated air or a stream of heated inert gas such as nitrogen. Although a single temperature and air velocity may be used for a suitable time, for best results, the drying sequence consists of two phases. In the first phase the rice is exposed to a strong, preferably upward, stream of heated air and raised to a bed temperautre of from 250 to 350° F., preferably from 285 to 335° F., for raw rice; and from 300 to 360° F., and preferably initially from 330 to 350° F., for parboiled rice, for a total heat application period of from 3 minutes to 10 minutes, and preferably about 6 minutes. The time-temperature relationship is a prime determinant of the amount of expansion or porosity which occurs in the final product as taught in U.S. Patent No. 2,610,124 to Roberts. The partially dried rice may then be withdrawn temporarily from the heating medium, if desired, to apply additives to the partially dried rice, such as flavorings, seasonings, emulsifiers and the like by procedures such as spray coating with a solution or dispersion of the additive to be used.

In the second phase of the drying process, the partially dried rice kernels with essentially pre-set external size and structure are finished dried using heated air and a bed temperature of from 210 to 280° F., preferably from 230 to 270° F. for raw rice; and preferably from 220 to 250° F. for parboiled rice, for a residence time of from 4 to 15 minutes, and preferably from 11 to 14 minutes for raw rice, and preferably from 5 to 10 minutes for parboiled rice.

This procedure permits the final drying of the rice grains to a moisture level of from 9 to 11%.

The dried rice is gently milled to break up large agglomerate clumps, prior to screening to separate "unders" and "overs" cuts from the product stream. The clumps or "overs" are further milled, as required, for size reduction, and further recovery of individual grains to be added to the main product stream prior to vitamin enrichment, if provided, and packaging.

The dried product of this invention, with a specific gravity of from 0.3 to 0.5 gm./cm.$^3$ can be rehydrated rapidly upon standing in water which has been brought to a boil, the amount of water required and the stand time being dependent upon the raw material type and variety being used, and upon the specific conditions under which the unit processes described above are conducted. With the precooked raw rice of this invention, using equal volumes of dried product and water, stand times from 2 to 5 minutes yield an extremely white or light fluffy rice with retention of natural flavor and with a high degree of grain individuality. With the precooked parboiled rice of this invention, using equal volumes of dried product and water, stand times from 3 to 10 minutes yield a light fluffy rice with retention of the natural flavor and high degree of grain individuality characteristic of parboiled rice, together with a high degree of resistance to crumbling or falling apart in recipe applications typical of parboiled rice.

The precooked parboiled rice product can also be rehydrated by immersion in cold water of a volume equal to the rice which is then brought to a boil with salt or butter added, if desired, and which, upon reaching a moderate rolling boil, is covered, removed from the heat, and allowed to stand for from 3 to 10 minutes. The rice is then ready for serving, and is again an extremely light fluffy rice with retention of natural flavor and texture and a high degree of grain individuality, characteristic of parboiled rice.

With the following slight variations in the basic process described above, it is possible to produce a very rapidly rehydratable precooked white rice.

The same pretreatment as described above is used except that the thermal cycling temperatures will tend toward the upper part of the preferred ranges, e.g., about 160° F. for the first heating step, about 85° F. for the quick-chill or cooling step, and about 180° F. for the second heating step. Preferably, each of the steps should be about 5 minutes in duration. In one preferred embodiment of this invention a second quick-chill or cooling step is used to achieve a final rice temperature of about 125° F. by use of cool air, water spray, or a combination of both.

Upon completion of the pretreatment, the rice is immersion cooked or cooked by combined immersion, spraying and steaming, for about 12 to 14 minutes and at an average temperature of about 203° F.

Upon completion of the cooking step, the rice is steamed for from 2 to 3 minutes. It is then quenched with cold water, washed and drained for about 5 minutes. The water used throughout this process is preferably at a pH of about 7 to 8.

The rice is then subjected to the first phase drying at a temperature of about 325° F. for about 6 to 7 minutes. The second phase drying is then accomplished at about 275° F. for about 13 minutes. Upon completion of the drying the moisture content of the rice should be from 6 to 10%, preferably at the lower end of this range. The completion of the drying is followed by the usual screening and gentle working of the grains. Ideally, the rice grains at a moisture content close to 6% are then packaged with a suitable packaging material to retain this low moisture content.

The just described precooked rice product can be rehydrated by immersion in cold water of a volume equal to the rice which is then brought to a boil with salt or butter added, if desired, and which, upon reaching a moderate rolling boil, is covered, removed from the heat, and allowed to stand for from 30 seconds to 2 minutes. The rice is then ready for serving, and is again an extremely light fluffy rice with retention of natural flavor and texture and a high degree of grain individuality.

The above-described basic process is easily adaptable to preparing a precooked brown rice product from brown rice. To achieve the precooked brown rice product, the pretreatment of this invention is administered at a slightly more elevated temperature than is called for with raw milled white rice. The brown rice should be cooked for from 15 to 25 minutes after the thermal cycling pretreatment. In other respects the process for brown rice does not differ from the basic process.

As an alternative to the above process for preparing precooked brown rice, after the brown rice has been subjected to the thermal cycling pretreatment, a preliminary soaking may be used, of the order of 30 minutes immersion in tepid water, e.g., at about 150° F. The soaking may take place under slight pressure, and if slight pressure is administered, the cooking time may be in the lower part of the prescribed range, or about 15 minutes. This process for preparing precooked brown rice yields a product having a density of about 0.4 gm./cm.$^3$.

For a clearer understanding of the invention, specific examples of the invention are given below. These examples are merely illustrative and are not to be understood as limiting the scope or underlying principles of the invention. The invention in its broader aspects is thus not limited to the specific processes and steps described, but also includes within the scope of the accompanying claims any departures made from such processes and steps which do not depart from the principles of the invention and which do not sacrifice its chief advantages.

As used in the claims, the term "rice" refers to and includes: milled white rice, brown rice, parboiled rice, and any other equivalent forms of rice, and the term "heated inert gas" will be understood to include heated air.

*Example I*

Raw milled white rice of the Bluebonnet variety with a moisture content of 11.8% was charged to a batch thermal cycling chamber to a bed depth of about 1". It was brought to a temperature of 140° F. in 30 seconds and maintained at that temperature by passage of heated air for 4 minutes and 30 seconds. At the completion of that time, the moisture content was 10%, and the rice was noted to have a number of heat induced expansion rifts and crevices. The rate of heat transfer as measured by the bed temperature of the rice during the first 30 seconds of this heating step was about 57 B.t.u./lb./min.

The rice was next air cooled, reaching a temperature of 98° F., in 3 minutes, and 88° F., in 5 minutes, at which time the moisture content was 9%, and the rice was observed to have a number of chinks and cracks induced by the compression of rapid chilling. The rate of heat transfer in this chilling step as measured by the bed temperature of the rice during the first minute of chilling was about 9 B.t.u./lb./min.

The temperature of the rice was next raised to 164° F. in 3 minutes, and maintained there for 2 minutes by preheated air; this reduced the moisture content to 6.0% opening up the compression chinks and cracks and introducing some additional heat expansion rifts and crevices. The rate of heat transfer as measured by the bed temperature of the rice during the first 30 seconds of this second heating step was about 56 B.t.u./lb./min.

The pretreated rice was then cooked in an excess of water at 202° F. for 12 minutes in a cooker equipped with a basket containing the rice, and the basket was raised and lowered to provide gentle agitation. This cook served to substantially gelatinize the starch in the rice and raised the moisture content to 70%.

The basket was then raised above the surface of the cook water and the cook water drained from the rice for 2 minutes while the basket was immersed in steam. The moisture content of the rice after steaming was 70% or essentially the same as before steaming.

The precooked rice was then reduced in temperature using a water wash which, in addition to stopping the cook, served to clean the grain surfaces of ruptured starch cells. A temperature of 90° F. was reached after washing for 1 minute and a temperature of 66° F. was reached after another 3 minutes. Washing was accomplished by rapidly pumping a mixture of water and rice into and out of a vessel containing 6 gallons of water per pound of rice. After washing, the rice was drained on a screen for 3 minutes, washed once more gently with water from a hose and drained for another 8 minutes. The moisture content of the rice was then observed to be 74%.

The drained rice was then dried in a 1" thick bed by a two-stage drying sequence. First, preheated air was passed upwardly through the bed which was maintained at 260° F. for 6 minutes, with an air pressure drop of 0.6" of water across the bed. The direction of air flow was then changed, and this required 2 minutes. Finally, air was passed downwardly through the bed for 10 minutes with a 0.3" pressure drop while the bed was maintained at 210° F. The moisture content of the rice was reduced by drying to about 10%.

The processed rice was observed to have a specific gravity of 0.384 gm./cm.$^3$. One cup or 90 grams was rehydrated by the addition of one cup or 232 ml. of water, which had been brought to a boil. After standing 5 minutes, this yielded a rehydrated volume of 405 cubic centimeters of light and fluffy rice with a highly palatable flavor and texture.

The heat transfer rates in the above example should be considered illustrative rather than limiting.

Heat transfer rates particularly suitable for the process, whether applied to white milled rice, brown rice, or parboiled rice, as described herein and as measured by the bed temperature of the rice are from about 40 B.t.u./lb./min. to about 70 B.t.u./lb./min., and preferably from about 50 B.t.u./lb./min. to 62 B.t.u./lb./min. for the first 30 seconds of the first heating step; from about 6 B.t.u./lb./min. to about 12 B.t.u./lb./min., and preferably from about 8 B.t.u./lb./min. to 10 B.t.u./lb./min. during the first minute of the chilling step; and from about 40 B.t.u./lb./min. to about 70 B.t.u./lb./min., and preferably from about 50 B.t.u./lb./min. to 62 B.t.u./lb./min. for the first 30 seconds of the second heating step.

The heat transfer rate for the first 30 seconds of the first or initial heating step has been pointed out above and should be high enough to cause rifts and crevices to form in the surface of the rice grains; the heat transfer rate for the first minute of the chilling step should be rapid enough to induce compression chinks and cracks to form in the rice grains; and the heat transfer rate for the first 30 seconds of the second heating step should be high enough to cause the rice grains to once more expand, to drive off additional moisture, and to cause the previously formed expansion rifts and crevices and compression chinks and cracks to open and enlarge and to cause the formation of some additional expansion crevices.

*Example II*

Raw milled white rice of the Bluebonnet variety with a moisture content of 12% was fed on a continuous wire mesh conveyor belt at a bed depth of about 1 inch through a thermal cycling system consisting of a series of enclosed chambers or compartments. In the first chamber the rice was contacted by air at an elevated temperature with the air being forced upwardly through the bed. The bed or rice temperature was thus raised to 186° F. in about 30 seconds and maintained at that plateau temperature for about 5.5 minutes.

The bed of rice then passed into a second chamber in which the bed was contacted by a forced flow of upwardly moving cold air at about 72° F. This air rapidly reduced the bed temperature and chilled the rice grains during a total residence time of 6 minutes.

The moving bed of rice was then conveyed into a third chamber where it was again contacted with a forced flow of upwardly moving heated air. This forced flow of hot air raised the temperature of the bed to 184° F. in about 0.5 minute and maintained the bed at that plateau temperature for about 5.5 minutes.

The bed of rice then entered a fourth stage of the thermal cycling system in which it was again contacted by a downwardly moving forced draft of cold air at a temperature of about 60° F. for 30 seconds. Immediately thereafter the thermally cycled rice was discharged onto a transfer belt and exposed while on this belt to ambient air at temperatures of from 60° to 80° F. This exposure to ambient air induced further cooling of the rice over a period of about 30 seconds residence time.

At the end of the transfer belt the rice was quenched with water at a temperature of about 70° F. The rice then entered the front end of a rotary cooker at a rice temperature of about 80° F.

The rice was then cooked first by exposure to an excess of water at 202 to 204° F. with intermittent exposure to atmospheric steam for about 11 minutes in a modified rotary blancher type cooker. The cooker included an internal squirrel cage horizontal cylinder filled to about 45% of its depth with water. The remaining 55% of the cylinder volume was filled with atmospheric steam fed into the upper section of the blancher by steam spargers. The rice tended to adhere to the walls of the inner squirrel cage cylinder and was moved along the longitudinal axis of the cooker by a helical screw. The rice was thereby partially carried upwardly out of the cooking water into the steam and then reimmersed by dropping back into the water, whereby it was intermittently exposed to hot water immersion and to steaming.

The rice was then discharged from the cooker and flumed with the addition of cold water to arrest further cooking into a second stage cooker. The second stage cooker comprised an upwardly inclined belt equipped with steam spargers below the belt and hot water spray nozzles above the belt in an enclosed chamber. Atmospheric steam from the spargers rose through the belt and bed, and water at about 185° F. was sprayed on the rice bed from above and descended through the bed and belt. The residence time of the rice in the second stage cooker provided about 4 minutes of simultaneous water spraying and steam cooking. The cooking system used thus consisted initially of a multiplicity of alternate steaming and immersion steps followed by a prolonged simultaneous spraying plus steaming step. The moisture content of the essentially cooked rice was observed to be about 70%.

The rice was again quenched with cold water, drained for 4 minutes on a drain belt and dried by exposure to heated air in a compartmented apron type tunnel drier, having three compartments in series at temperatures of 280° F., 260° F., and 180° F., respectively. Total residence time of the rice in the drier was 20 minutes. Upon emerging from the drier the rice was essentially uniformly dry, possessed a stable moisture content, was white in color, and had a generally pleasing appearance.

The final product had a moisture content of 9 to 11%, was substantially gelatinized, displayed a hard or white center count of from 0 to 2%, and rehydrated to a rice having attributes very closely approaching those of a good grade of properly cooked milled white rice. This final product had a specific gravity of 0.395 gms./cm.$^3$.

*Example III*

Brown rice of the Bluebonnet variety with a moisture content of 11.2% was thermally cycled as in Example I to temperatures of 185° F. in 45 seconds and held there for 3 minutes and 15 seconds, to 108° F. in 4 minutes, and to 185° F. in another 4 minutes and held there for 3 minutes. The moisture content after this treatment was 7.2%.

The rice was then precooked at 203° F., in water immersion using an excess of water for 19 minutes, and thereafter the rice was steamed for 2 minutes. The moisture content after immersion cooking was 71% and was substantially the same after steaming.

The rice was then quenched and washed with cool water for 4 minutes, drained for 3 minutes, briefly hose-washed and redrained for 6 minutes, and the moisture content was then 73%.

The drained brown rice was dried initially for 6 minutes with air upflow at 265° F., and a pressure drop of 0.65" of water, then with a downward flow of air for 14 minutes at 220° F., and a pressure drop of 0.30" over the bed. The dry precooked brown rice product was observed to have a specific gravity of about 0.4 and a moisture content of 11%. One cup or 94 grams rehydrated upon immersion and standing for 5 minutes in 232 ml. of water which had been brought to a boil, to 350 ml. of highly palatable brown rice with a flavor and texture very closely approaching that of a well-prepared brown rice. Alternatively, if an extra tender texture is desired, the dry product can be added to boiling water and therein simmered for 5 minutes.

*Example IV*

Parboiled Texas Bluebonnet at a moisture content of 10.0% was placed in a batch thermal cycling chamber to a bed depth of about ¾ inch. It was brought to a temperature of 210° F., in 50 seconds and held there by passing heating air through it for 4 minutes and 10 seconds at which time the moisture content was lowered to 8.2% and the rice was noted to have a multiplicity of very small heat-induced expansion rifts and crevices.

The parboiled rice was next air cooled, to a temperature of 114° F., in 3 minutes and to 82° F., in five minutes, at which time the moisture content was 8.8% and the rice was observed to have a multiplicity of very small chinks and cracks induced by the compression of rapid chilling.

The temperature of the rice was next raised to 210° F., in five minutes by passing preheated air through the bed; this reduced the moisture content to 7.4% opening up the compression chinks and cracks and introducing some additional heat expansion rifts and crevices.

The pretreated rice was then cooked in an excess of water at 210° F., for 23½ minutes in a cooker equipped with a basket containing the rice, and the basket was raised and lowered to gently agitate this rice. This cook served to substantially gelatinize the starch in the rice and raised the moisture content to 73.2%.

The basket was then raised above the surface of the water and quenched to a temperature of 80° F., by passing water at tap temperature through it for 2 minutes while draining the cook water out of the cooker.

The lid was then closed on the cooker and the rice was submitted to steam at atmosphere pressure for 4 minutes at which time the moisture content was 72.0%, or essentially unchanged.

The precooked rice was then reduced in temperature to 82° F., with a water quench for 2 minutes which superficially cleaned the rice.

The precooked rice was then washed in a surplus of water at ambient temperature for 3 minutes after which the temperature of the rice was lowered to 73° F., and the moisture content was 73.2%. Washing was done by rapidly pumping a mixture of water and rice in and out of a vessel containing 6 gallons of water per pound of rice. After washing in the washer the rice was drained on a screen and again washed with a hose for 2 minutes. The rice was then allowed to drain on the screen for from 6 to 7 minutes.

The drained rice was then dried in a ½ inch thick bed in a two-stage drying sequence. First preheated air at a static pressure of 0.65" of $H_2O$ was passed up through the bed at a temperature of 340° F., in 5 minutes. The direction of air flow was then reversed which required 2.5 minutes and air was blown down through the bed at a temperature of 225° F., and a static pressure of 0.35" of water for 7 minutes. The moisture content of the rice was reduced by drying to about 10%.

The rice was observed to have a specific gravity of 0.39 gm./cm.$^3$. One cup, or 90 grams, was rehydrated by the addition of one cup or 232 ml. of water, which had been brought to a boil, to yield after standing 5 minutes a rehydrated volume of 385 cubic centimeters of light and fluffy looking rice with a highly palatable flavor and texture closely approaching a good grade of regular parboiled rice which has been properly cooked.

What is claimed is:

1. The proces of creating a precooked rice product that can be very rapidly rehydrated for serving and that upon rehydration substantially possesses the attributes of natural flavor and texture of a good grade of regular cooked rice, the process being characterized by a thermal cycling pretreatment to render the rice grains highly permeable and absorptive, and attained by a process comprising the steps of exposing the rice grains alternately to elevated and low temperatures, the grains being first exposed to an elevated temperature of from about 120° to 225° F., then to a low temperature of from about 60° to 100° F., and then for a second time to an elevated temperature of from about 120° to 230° F., whereby the rice grains are rendered highly permeable and adbsorptive; cooking the grains by subjection to heat and moisture until the grains reach a moisture content of from about 65 to 75% and are substantially completely gelatinized; and rapidly drying the cooked grains by spreading the grains in the form of a bed and raising the temperature of the bed to a temperature of from about 210° to 350° F. by passing a heated inert gas through the bed, whereby the cooked grains are rapidly dried to a stable moisture content.

2. The process of creating a precooked rice product that can be very rapidly rehydrated for serving and that substantially retains the natural taste and flavor of a good grade of regular cooked rice, the process being characterized by a thermal cycling pretreatment to render the rice grains highly permeable and absorptive and attained by a process comprising the steps of pretreating rice grains by exposing the grains alternately to a high temperature and a low temperature in succession, the grains being first exposed to a high temperature of from about 120° to 225° F., next to a low temperature of from about 60° to 100° F., and then again to a high temperature of from about 120° to 230° F., and thus to render the grains highly permeable and absorptive; cooking the grains by subjection to heat and moisture until the grains reach a moisture content of from about 65 to 75% and are substantially completely gelatinized; and rapidly drying the cooked grains by spreading them in the form of a bed and passing a heated inert gas therethrough to raise the bed temperature to a temperature of from about 210° to 350° F., whereby the cooked grains are rapidly dried to a stable moisture content.

3. The process of creating a precooked rice product that can be very rapidly rehydrated for serving and that substantially retains the natural taste and flavor of a good grade of regular cooked rice; the process being characterized by a thermal cycling pretreatment to render the rice grains highly permeable and absorptive and attained by a process comprising the steps of exposing rice grains alternately to high and low temperatures in succession, including at least two exposures to a high temperature within the range of from about 120° to 230° F. and one exposure to a low temperature within the range of from about 60° to 100° F. as an intermediate step between the two high temperature exposures, whereby the rice grains are rendered highly permeable and absorptive; cooking the grains by subjection to heat and moisture until the grains reach a moisture content of from about 65 to 75% and are substantially completely gelatinized; and rapidly drying the cooked grains by spreading the grains in the form of a bed and raising the temperature of the bed to a temperature of from about 210° to 350° F. by passing a heated inert gas through the bed, whereby the cooked grains are dried to a stable moisture content.

4. The process of creating a precooked rice product that can be very rapidly rehydrated for serving and that upon rehydration substantially possesses the attributes of natural flavor and texture of a good grade of regular cooked rice, the process being characterized by a thermal cycling pretreatment to render the rice grains highly permeable and absorptive, and attained by a process comprising the steps of pretreating the rice grains by exposing the grains to a first high temperature of from about 120° to 225° F. to create expansion rifts and crevices in the surfaces of the grains, then exposing the heated grains to a low temperature of from about 60 to 100° F. to create compression chinks and cracks in the surface of the grains, and then exposing the cooled grains to a second high temperature of from about 120° to 230° F. to open the compression chinks and cracks and enlarge the expansion rifts and crevices, whereby the rice grains are rendered highly permeable and absorptive; cooking the grains by subjection to heat and moisture until the grains reach a moisture content of from about 65 to 75% and are substantially completely gelatinized; and rapidly drying the cooked grains by spreading them in the form of a bed and passing heated inert gas therethrough to raise the bed temperature to a temperature of from about 210° to 350° F., whereby the cooked grains are rapidly dried to a stable moisture content.

5. The invention as defined in claim 3, in which, for raw rice, the first high temperature exposure is at a temperature of from 130 to 180° F., in which the low temperature exposure is at a temperature of from 85 to 95° F., and in which the second high temperature exposure is at a temperature of from 140 to 190° F.

6. The invention as defined in claim 3, in which, for parboiled rice, the first high temperature exposure is at a temperature of from 200 to 225° F., in which the low temperature exposure is at a temperature of from 60 to 100° F., and in which the second high temperature exposure is at a temperature of from 200 to 225° F.

7. The invention as defined in claim 3, in which, for parboiled rice, the first high temperature exposure is at a temperature of about 210° F., in which the low temperature exposure is at a temperature of from 75 to 90° F., and in which the second high temperature exposure is at a temperature of about 210° F.

8. The invention as defined in claim 3 in which the rice grains are subjected to both the first and second high temperature exposures and the low temperature exposure for a duration of about 5 minutes for each exposure.

9. The invention as defined in claim 3, in which, for raw milled rice, the cooking step has a duration of from 9 to 13 minutes.

10. The invention as defined in claim 3, in which, for parboiled rice and brown rice, the cooking step has a duration of from 18 to 25 minutes.

11. The invention as defined in claim 3, in which the cooking of the rice grains is accomplished by alternate immersion in water at 195 to 210° F., and steaming.

12. The invention as defined in claim 3, in which the cooking step is followed by a steaming step whereby the surface of the rice grains is firmed with substantially no additional cooking of the grain and without the driving off of flavor elements.

13. The invention as defined in claim 3, in which the rice grains are subjected to a water quenching step upon completion of the cooking step.

14. The invention as defined in claim 3, in which the rice grains are washed in cold water and drained upon completion of the cooking step and prior to the drying step.

15. The invention as defined in claim 3, in which, for raw rice, the drying step is accomplished in two phases, the rice grains in the form of a bed being subjected to heated inert gas at a temperature of from 250° to 350° F. in the first stage, and the rice grains being subjected to a temperature of from 210° to 280° F. in the second stage, with the second stage temperature always being substantially less than the first stage temperature.

16. The invention as defined in claim 3, in which, for parboiled rice, the drying step is accomplished in two phases, the rice grains in the form of a bed being subjected to heated inert gas at a temperature of from 300° to 360° F. in the first stage, and the rice grains being subjected to a temperature of from 210° to 280° F. in the second stage, with the second stage temperature always being substantially less than the first stage temperature.

17. The invention as defined in claim 3, in which the rice before treatment is a raw milled white rice.

18. The invention as defined in claim 3, in which the rice before treatment is a raw brown rice.

19. The invention as defined in claim 3, in which the rice before treatment is a parboiled rice.

20. The invention as defined in claim 3, in which the rice grains are in the form of a bed when subjected to the thermal cycling pretreatment; in which the heat transfer rate as measured by the bed temperature of the rice during the first high temperature step is sufficiently high to cause rifts and crevices to form in the surface of the rice grains; in which the heat transfer rate during the low temperature step is sufficiently rapid to induce compression chinks and cracks to form in the rice grains; and in which the heat transfer rate during the second high temperature step is sufficiently high to cause the previously formed expansion rifts and crevices and compression chinks and cracks to open and enlarge and to cause the formation of additional expansion crevices.

21. The invention as defined in claim 3, in which the rice grains are in the form of a bed when subjected to the thermal cycling pretreatment, and in which the range of rates of heat transfer as measured by the bed temperature of the rice during portions of the pretreatment steps are as follows: from about 40 B.t.u./lb./min. to about 70 B.t.u/lb./min. during the first 30 to 75 seconds of the first high temperature step, from about 6 B.t.u./lb./min. to about 12 B.t.u./lb./min. during about the first minute of the low temperature step, and from about 40 B.t.u./lb./min. to about 70 B.t.u./lb./min. during the first 30 to 75 seconds of the second high temperature step.

22. The invention as defined in claim 3, in which the rice grains are subjected to a water quench after the second high temperature exposure and before cooking.

23. The invention as defined in claim 3, in which the rice grains are exposed to a second low temperature of from 60 to 100° F. after the second high temperature exposure and before cooking.

24. The invention as defined in claim 23, in which the rice grains are subjected to a water quench after the second low temperature exposure and before cooking.

25. The invention as defined in claim 23, in which during the thermal cycling pretreatment the grains are exposed to high temperatures by subjecting them to a flow of heated air and are exposed to low temperatures by subjecting them to a flow of cool air.

26. The invention as defined in claim 2, in which the rice grains are exposed to a second low temperature of from 60 to 100° F. after the second high temperature exposure and before cooking.

References Cited by the Examiner
UNITED STATES PATENTS

| | | | |
|---|---|---|---|
| 400,835 | 4/89 | Donelson | 99—80 |
| 470,140 | 3/92 | Donelson | 99—80 |
| 2,195,165 | 3/40 | Choppin et al. | 99—80 |
| 2,610,124 | 9/52 | Roberts | 99—80 |
| 2,696,156 | 12/54 | Campbell et al. | 99—80 |
| 2,720,460 | 10/55 | Flynn et al. | 99—80 |
| 2,992,921 | 7/61 | Bardet et al. | 99—80 |

A. LOUIS MONACELL, *Primary Examiner.*

RAYMOND N. JONES, *Examiner.*